(No Model.)
A. T. DOERR.
HAME COUPLING.
No. 529,647. Patented Nov. 20, 1894.
Fig. 1.
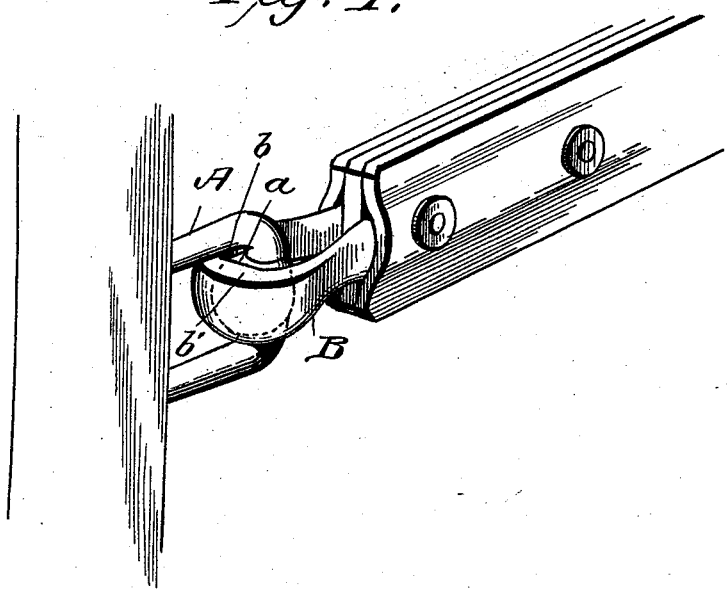
Fig. 2.
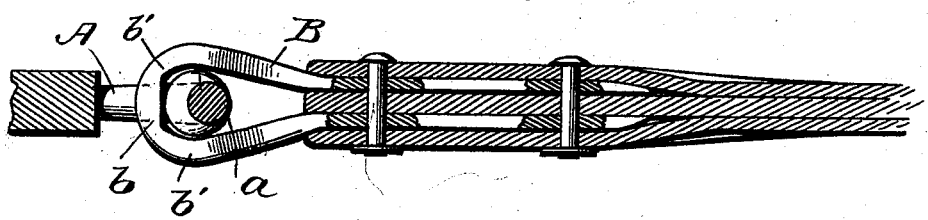
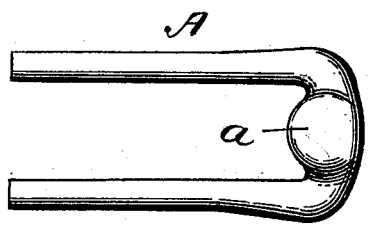
Fig. 3.
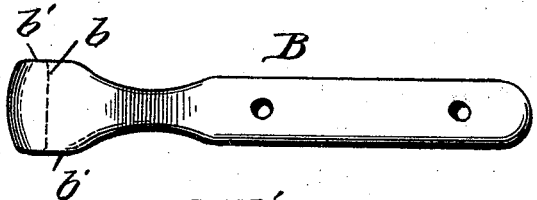
Fig. 4.
Witnesses
Inventor
August T. Doerr

UNITED STATES PATENT OFFICE.

AUGUST THEODORE DOERR, OF HARVEL, ILLINOIS.

HAME-COUPLING.

SPECIFICATION forming part of Letters Patent No. 529,647, dated November 20, 1894.

Application filed March 20, 1894. Serial No. 504,397. (No model.)

*To all whom it may concern:*

Be it known that I, AUGUST THEODORE DOERR, a citizen of the United States, residing at Harvel, in the county of Montgomery, State of Illinois, have invented certain new and useful Improvements in Hame-Couplings; and I do hereby declare the following to be a full, clear, and exact description of the invention, such as will enable others skilled in the art to which it appertains to make and use the same.

This invention relates to an improvement in hame couplings, the object being to decrease the contact surfaces of the parts, and consequently reduce the friction and prolong the usefulness of the coupling.

With this object in view my invention consists of a staple adapted to be inserted in the hame and having a round or globular enlargement formed upon the connecting member of the staple said enlargement projecting inwardly toward the hame, and a clip connected with the tug or trace, and through which the staple is passed, said clip having the inner face of its connecting member made flat to provide a bearing surface for the ball like enlargement of the staple.

My invention consists also in certain details of construction and combination of parts, all of which will be fully described and pointed out in the claims.

In the accompanying drawings which fully illustrate my invention,—Figure 1 is a perspective view of my improved hame coupling. Fig. 2 is a horizontal sectional view of the same. Fig. 3 is a detail view of the clip; and Fig. 4 is a detail view of the staple.

In carrying out my invention I employ a staple A, and clip B, said parts being connected to the hame and tug respectively, in the ordinary manner. The staple and clip are also connected as usual but it is the peculiar construction of these parts that forms the feature of my invention, the idea being to provide a very small bearing surface and in this way reduce the friction between them. To do this I construct the staple A with a globular or ball like enlargment $a$ upon the connecting member of the same said ball or enlargement projecting inwardly toward the hame, and, where, this ball bears against the connecting member of the clip B, I flatten the surface of the clip as shown at $b$ so that the ball has a perfectly flat surface to bear against, and as the parts move in conjunction with the horse's movements, the ball, will roll, or turn upon the flat surface and not slide or work, and in this manner the friction is greatly reduced and the life of the coupling prolonged. The relative sizes of the staple and clip are such that the parts can have a limited swinging movement, but no sliding movement.

The upper and lower edges of the connecting member of the clip are, also flattened and extended for a short distance as shown at $b'$ so that the parts can have a movement in each direction through about forty-five degrees, and the staple bearing upon said flattened portion $b'$ will hold the ball $a$ in its proper position and prevent it sliding when the parts are moved at an angle to each other. It will thus be seen that I provide a coupling in which the parts contact tangentially only and the friction is consequently reduced so that a coupling constructed in accordance with my invention will outwear a number of couplings connected in the ordinary manner or one constructed with a ball and socket joint.

Another advantage of my couplings is that it can be made to snugly fit the collar, and the hame will rarely, if ever, be thrown from the collar as commonly happens with the couplings now in use.

Another advantage is that the clip and ball are so constructed that the parts can be hung at right angles to each other as shown by dotted lines Fig. 4 without becoming interlocked when it is desired to return them to their normal positions.

Having thus described my invention, what I claim, and desire to secure by Letters Patent, is—

In a hame coupling a staple having a ball like enlargment and a clip having the upper and lower edges of its connecting member flattened and extended, and the interior face of said member flattened to provide a bearing surface for the ball like enlargement, substantially as shown and described.

In testimony whereof I affix my signature in presence of two witnesses.

AUGUST THEODORE DOERR.

Witnesses:
WILLIAM J. ZIMMERMAN,
THOS. S. EDWARDS.